(12) United States Patent
Velde et al.

(10) Patent No.: US 9,956,874 B2
(45) Date of Patent: May 1, 2018

(54) TRACTION CONTROL METHOD AND APPARATUS FOR A WORK VEHICLE WITH INDEPENDENT DRIVES

(71) Applicant: Deere & Company, Moline, IL (US)

(72) Inventors: Todd F. Velde, Dubuque, IA (US); Eric R. Anderson, Galena, IL (US)

(73) Assignee: DEERE & COMPANY, Moline, IL (US)

( * ) Notice: Subject to any disclaimer, the term of this patent is extended or adjusted under 35 U.S.C. 154(b) by 174 days.

(21) Appl. No.: 14/616,209

(22) Filed: Feb. 6, 2015

(65) Prior Publication Data

US 2015/0246612 A1     Sep. 3, 2015

Related U.S. Application Data

(60) Provisional application No. 61/947,344, filed on Mar. 3, 2014.

(51) Int. Cl.
*B60K 7/00* (2006.01)
*B60K 28/16* (2006.01)
(Continued)

(52) U.S. Cl.
CPC ............... *B60K 28/16* (2013.01); *B60K 7/00* (2013.01); *B60K 17/354* (2013.01); *B60L 3/102* (2013.01); *B60L 3/106* (2013.01); *B60L 11/08* (2013.01); *B60L 15/20* (2013.01); *B60L 15/2036* (2013.01); *B60W 30/18172* (2013.01); *E02F 9/0841* (2013.01); *E02F 9/207* (2013.01); *E02F 9/2079* (2013.01); *E02F 9/2253* (2013.01); *B60L 2200/40* (2013.01); *B60L 2210/30* (2013.01); *B60L 2210/40* (2013.01); *B60L 2220/44* (2013.01); *B60L 2240/421* (2013.01);
(Continued)

(58) Field of Classification Search
None
See application file for complete search history.

(56) References Cited

U.S. PATENT DOCUMENTS 5,508,924 A     4/1996   Yamashita
6,631,320 B1    10/2003  Holt et al.
(Continued)

FOREIGN PATENT DOCUMENTS

EP     1018451 A1     7/2000
EP     1716737 A1     11/2006
(Continued)

OTHER PUBLICATIONS

European Search Report issued in counterpart European Patent Application No. 15154561.3, dated Jun. 17, 2016 (9 pages).

*Primary Examiner* — Abby Y Lin
*Assistant Examiner* — Paul A Castro

(57) ABSTRACT

A method and apparatus for controlling traction of a vehicle with independent drives or motors connected to the wheels or other ground engaging apparatuses. Nominal torque allocations can be determined for a set of motors, the motors connected to ground engaging elements and including a front set of motors and a rear set of motors. The nominal torque allocations can be modified based on a lateral differential correction and a fore-aft differential correction to produce modified torque commands and the modified torque commands can be applied to the set of motors.

6 Claims, 9 Drawing Sheets

(51) Int. Cl.
*B60K 17/354* (2006.01)
*B60L 3/10* (2006.01)
*B60L 15/20* (2006.01)
*B60W 30/18* (2012.01)
*E02F 9/20* (2006.01)
*E02F 9/08* (2006.01)
*E02F 9/22* (2006.01)
*B60L 11/08* (2006.01)
*B60W 50/00* (2006.01)

(52) U.S. Cl.
CPC ... *B60L 2240/423* (2013.01); *B60L 2240/461* (2013.01); *B60L 2240/463* (2013.01); *B60L 2240/465* (2013.01); *B60L 2250/26* (2013.01); *B60L 2260/28* (2013.01); *B60W 2050/0012* (2013.01); *B60W 2300/17* (2013.01); *B60W 2520/263* (2013.01); *B60W 2520/266* (2013.01); *B60W 2720/263* (2013.01); *B60W 2720/266* (2013.01); *B60W 2720/403* (2013.01); *B60W 2720/406* (2013.01); *B60Y 2200/412* (2013.01); *B60Y 2200/415* (2013.01); *B60Y 2200/417* (2013.01); *Y02T 10/645* (2013.01); *Y02T 10/648* (2013.01); *Y02T 10/70* (2013.01); *Y02T 10/7077* (2013.01); *Y02T 10/7241* (2013.01); *Y02T 10/7275* (2013.01)

(56) References Cited

U.S. PATENT DOCUMENTS

| | | | |
|---|---|---|---|
| 7,314,424 | B2 | 1/2008 | Supina et al. |
| 8,008,791 | B2* | 8/2011 | Yamakado ............ B60K 6/48 180/242 |
| 8,527,124 | B2 | 9/2013 | Velde et al. |
| 2011/0040460 | A1* | 2/2011 | Velde .................... B60L 3/104 701/50 |

FOREIGN PATENT DOCUMENTS

| | | | |
|---|---|---|---|
| JP | 2003111207 A | 4/2003 | |
| JP | 2005147056 A | 6/2005 | |
| JP | 2013192446 A | 9/2013 | |
| WO | 2009128815 A1 | 10/2009 | |
| WO | WO 2009128815 A1 * | 10/2009 | ............ B60L 3/104 |

* cited by examiner

TRACTION CONTROL METHOD AND APPARATUS FOR A WORK VEHICLE WITH INDEPENDENT DRIVES

This application claims the priority benefit of U.S. Provisional Application No. 61/947,344, filed Mar. 3, 2014, said Provisional Application in its entirety being hereby incorporated by reference into the present specification.

FIELD OF THE DISCLOSURE

The present disclosure generally relates to work machines, and, more particularly, to a method and apparatus for controlling traction of a vehicle with independent drives connected to the wheels or other ground engaging apparatuses.

BACKGROUND

Work machines, such as loaders are often configured with the engine behind the back wheels and the loader portion extending beyond the front wheels. This arrangement allows the weight of the engine to offset the load carried in the bucket of the loader portion. Such an arrangement allows for a significant variation in the amount of weight carried by each of the axles. This in turn is expressed by a varying effective diameter of the wheels and the torque needed to move the loader as the torque is individually applied to each wheel.

The power train in a conventional four-wheel drive loader includes a prime mover, and a device to mechanically couple the prime mover with the various wheels. Conventional power train configurations control excessive wheel spin by mechanically constraining the wheels, either laterally or transversely, or both. Work vehicles with multiple independent drive motors, such as electric motors, can utilize electric traction control.

SUMMARY

According to an aspect of the present disclosure, a work vehicle can include a front-left wheel, a front-left motor mechanically coupled to the front-left wheel to provide torque to the front-left wheel, front-right wheel, a front-right motor mechanically coupled to the front-right wheel to provide torque to the front-right wheel, a rear-left wheel, a rear-left motor mechanically coupled to the rear-left wheel to provide torque to the rear-left wheel, a rear-right wheel, a rear-right motor mechanically coupled to the rear-right wheel to provide torque to the rear-right wheel; and a traction controller electrically connected to the front-left motor, the front-right motor, the rear-left motor, and the rear-right motor, the traction controller configured to determine and apply an individual torque command to each of the front-left, front-right, rear-left, and rear-right motors. The individual torque command for the front-left motor can be based on at least in part a commanded torque, a front lateral differential correction, and a fore aft differential correction. The individual torque command for the front-right motor can be based on at least in part the commanded torque, the front lateral differential correction, and the fore aft differential correction. The individual torque command for the rear-left motor based on at least in part the commanded torque, a rear lateral differential correction, and the fore aft differential correction. The individual torque command for the rear-right motor based on at least in part the commanded torque, the rear lateral differential correction, and the fore aft differential correction.

The traction controller can be configured to determine a fore-aft differential speed and the fore-aft differential correction can comprise a fore-aft deadband integral term and a fore-aft deadband proportional term, the fore-aft deadband integral term can be based on at least in part the fore-aft differential speed and the fore-aft deadband proportional term can be based on at least in part the fore-aft differential speed.

The traction controller can be configured to determine a front lateral differential speed and to determine a rear lateral differential speed, the front lateral differential correction can comprise a front lateral deadband proportional term based on at least in part the front lateral differential speed, and the rear lateral differential correction comprises a rear lateral deadband proportional term based on at least in part the rear lateral differential speed.

The individual torque command for the front-left motor can equal a front-left motor nominal torque command plus the front lateral differential correction plus the fore-aft differential correction, the individual torque command for the front-right motor can equal a front-right motor nominal torque command minus the front lateral differential correction plus the fore-aft differential correction, the individual torque command for the rear-left motor can equal a rear-left motor nominal torque command plus the rear lateral differential correction minus the fore-aft differential correction. The individual torque command for the rear-right motor can equal a rear-right motor nominal torque command minus the rear lateral differential correction minus the fore-aft differential correction.

The front-left motor nominal torque command can equal the front-right motor nominal torque command and the rear-left motor nominal torque command can equal the rear-right motor nominal torque command.

The fore-aft deadband integral term can be unwound.

According to another aspect of the present disclosure, a work vehicle can include a pair of ground engaging front elements, the ground engaging front elements mechanically driven by at least one front motor, and a pair of ground engaging rear elements, the ground engaging rear elements mechanically drive by at least one rear motor. The work vehicle can further include a traction controller configured to determine and apply torque commands to the at least one front motor and the at least one rear motor, the traction controller correcting the torque commands based on at least in part a fore-aft speed error, a front lateral speed error, and a rear lateral speed error.

According to another aspect of the present disclosure, a method for determining the nominal torque allocations to a set of motors, the motors connected to ground engaging elements and including a front set of motors and a rear set of motors. The method can include the steps of modifying the nominal torque allocations based on a lateral differential correction and a fore-aft differential correction to produce modified torque commands, and applying the modified torque commands to the set of motors.

The method can include determining a fore-aft differential speed, where the fore-aft differential correction can include a fore-aft deadband integral term and a fore-aft deadband proportional term, the fore-aft deadband integral term can be based on at least in part the fore-aft differential speed and the fore-aft deadband proportional term can be based on at least in part the fore-aft differential speed.

The method can include determining a front lateral differential speed and determining a rear lateral differential speed, where the front lateral differential correction can include a front lateral deadband proportional term that can be based on at least in part the front lateral differential speed and the rear lateral differential correction can include a rear lateral deadband proportional term the can be based on at least in part the rear lateral differential speed.

The motors can include a right and a left motor, the modified torque allocation for the front-left motor can equal a front-left motor nominal torque command plus the front lateral differential correction plus the fore-aft differential correction, the modified torque command for the front-right motor can equal a front-right motor nominal torque command minus the front lateral differential correction plus the fore-aft differential correction, the modified torque command for the rear-left motor can equal a rear-left motor nominal torque command plus the rear lateral differential correction minus the fore-aft differential correction, and the modified torque command for the rear-right motor can equal a rear-right motor nominal torque command minus the rear lateral differential correction minus the fore-aft differential correction.

The front-left motor nominal torque command can equal the front-right motor nominal torque command and the rear-left motor nominal torque command can equal the rear-right motor nominal torque command.

The fore-aft deadband integral term can be unwound.

The above and other features will become apparent from the following description and accompanying drawings.

BRIEF DESCRIPTION OF THE DRAWINGS

The detailed description of the drawings refers to the accompanying figures in which.

Like reference numerals are used to indicate like elements throughout the several figures.

DETAILED DESCRIPTION

Figure 1:
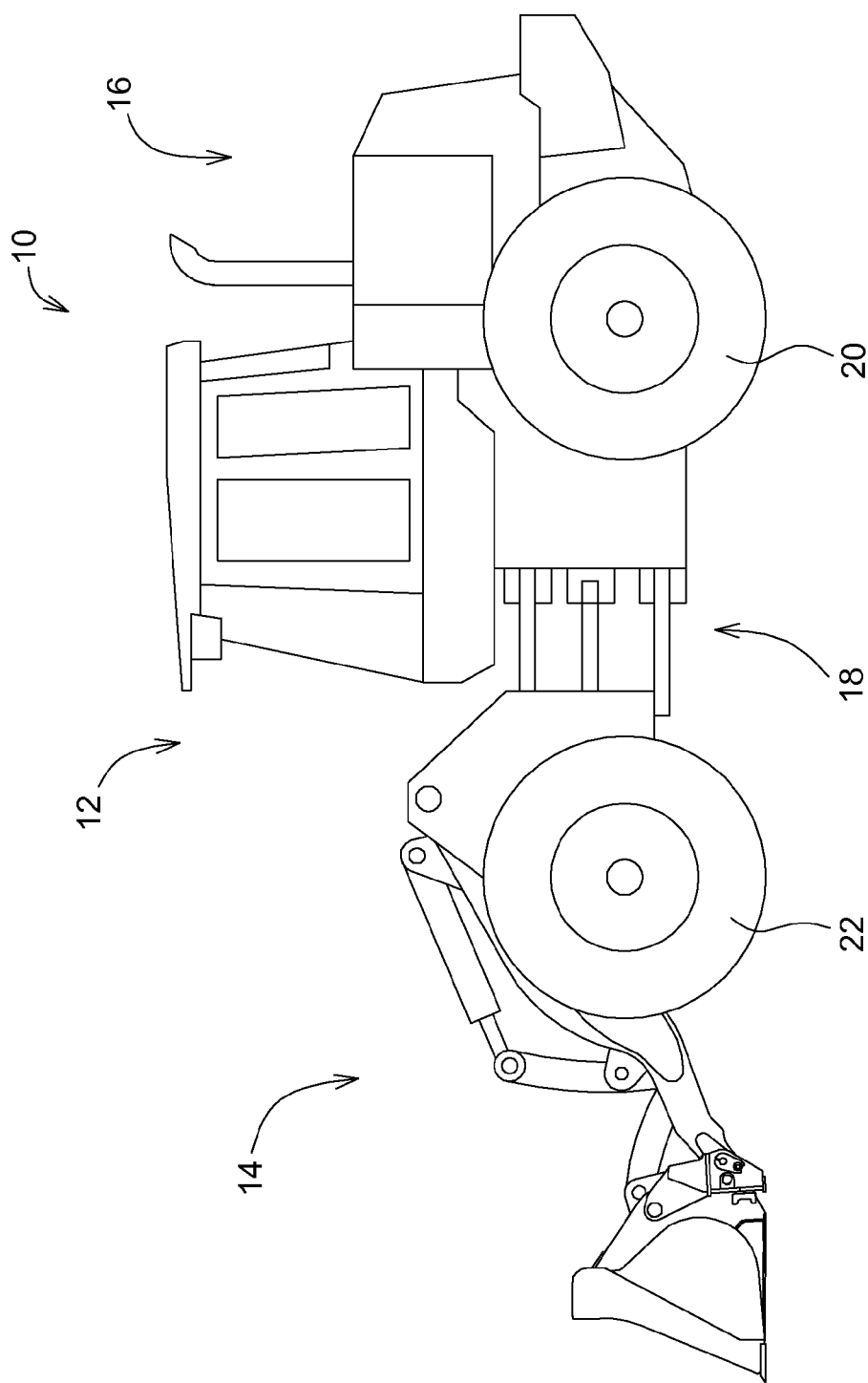
FIG. 1 is a is a side view of a work machine in accordance with an embodiment of the present disclosure.
Figure 6:
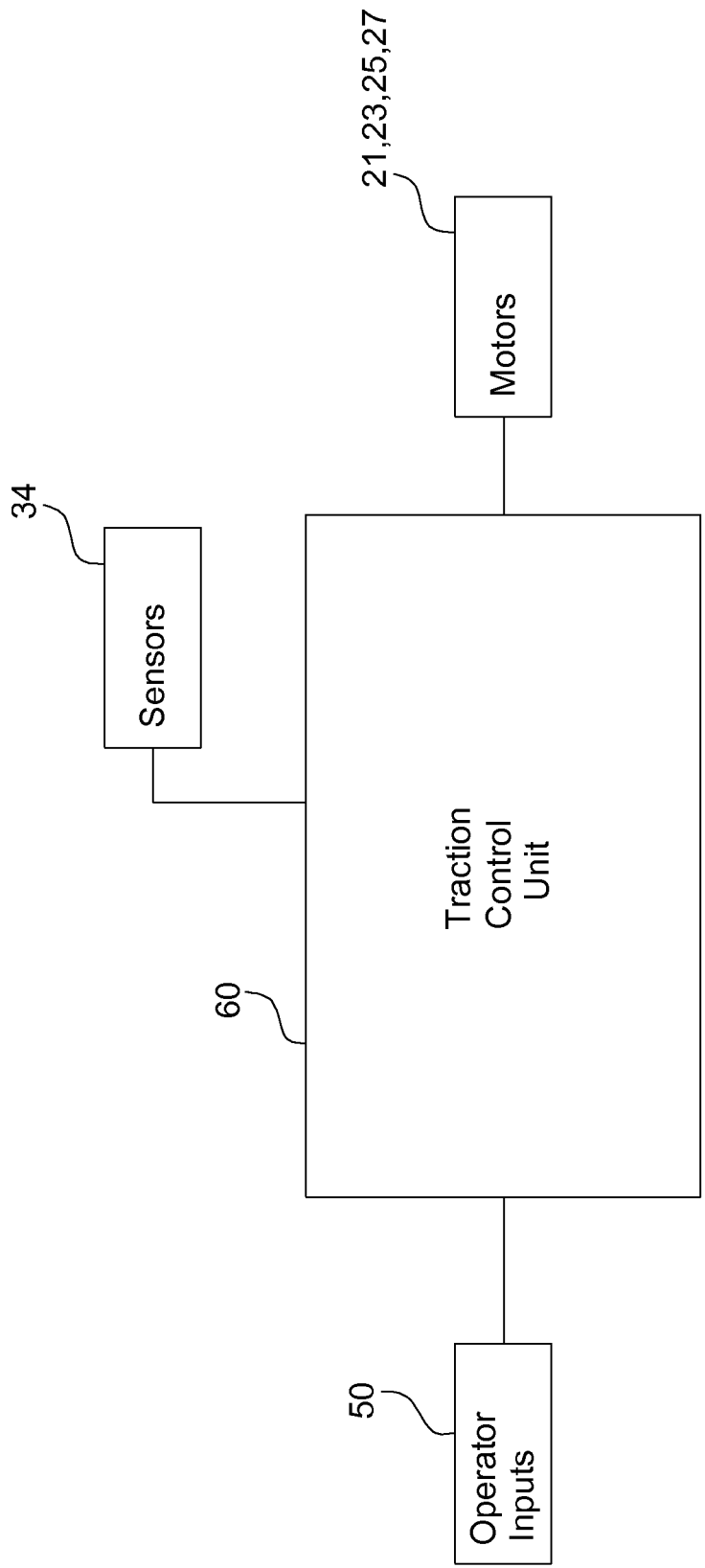
FIG. 6 is a block diagram of a drive system.
Figure 7:
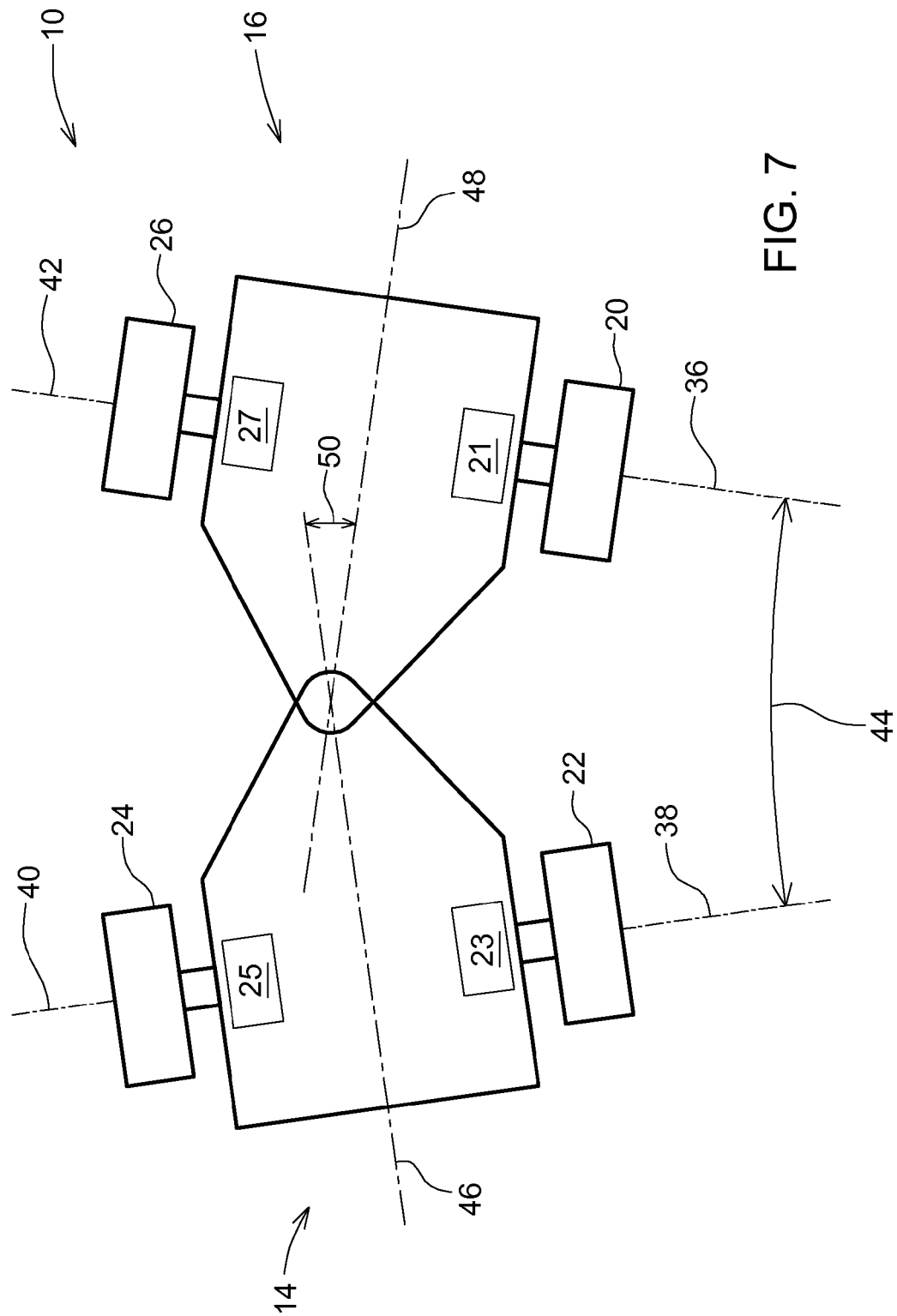
FIG. 7 is a schematic representation of an articulated vehicle, such as the work machine of FIG. 1.

Referring now to the drawings, and in particular FIGS. 1, 6, and 7, there is shown a work machine 10 in accordance with an embodiment of the present disclosure. Work machine 10 may be used for performing, for example, agricultural, industrial, construction, forestry work and/or mining operations, and may be an articulated wheel driven loader 10. Work machine 10 is a payload carrying vehicle that generally carries the payload in a manner that is exposed to the elements and is a load that can vary rapidly and/or be distributed in the load carrying portion in an uneven, unpredictable manner. For purposes of this application a loader vehicle shall include vehicles that have at least two drive units including a loader, a skid steer loader, a backhoe, a fork lift, a dump truck, a motor grader, a log skidder, a feller buncher, a log harvester, a log forwarder, and a vehicle that has an apparatus that can pick up a load from the ground. Embodiments of the present disclosure may also be used with other work vehicles that would benefit from such use, such as, for example, tractors, combines, self-propelled sprayers and other suitable vehicles.

Loader 10 includes a cab 12 in which the operator is housed along with controls for the control of the functions of loader 10. Loader 10 includes a front section, illustrated as a loader section 14 and a rear section, illustrated as a power section 16. Loader section 14 and power section 16 are connected at an articulation point and move relative to each other about this point by way of an articulation section 18. Portions of the power system may reside in either section 14 or 16.

Loader 10 includes wheels 20, 22, 24 and 26; each driven by a separate drive mechanism, such as motors 21, 23, 25, and 27, respectively. Drive system 28 includes a traction controller 60 that is connected with motors 21, 23, 25, and 27, operator inputs 62 and optionally sensors 34, which may be integral to the motors. Motors 21, 23, 25, and 27 may be electrically driven drive units (e.g., switched reluctance, permanent magnet, induction) each being associated with an individual wheel 20, 22, 24 and 26. Sensors 34 can detect, among other things, the rotational speed of each of motors 21, 23, 25, and 27 or wheels 20, 22, 24 and 26. In another embodiment, motors 32 are controlled by motor controllers and or inverters that can provide information about the rotation speed of motors 21, 23, 25, and 27 and/or wheels 20, 22, 24, and 26. In other embodiments, motors 21, 23, 25, and 27 have integral sensing to determine motor speed.

Wheel 20 rotates about an axis 36, wheel 22 rotates about an axis 38, wheel 24 rotates about an axis 40, and wheel 26 rotates about an axis 42. Axes 38 and 40 may be coaxial and in a like manner axes 36 and 42 may be coaxial. An angle 44 may be described as existing between the coaxial axes as illustrated in FIG. 7. Center line 46 of loader section 14 and center line 48 of power section 16 form an angle 50 known as the articulation angle between section 14 and 16, which corresponds to angle 44.

In one embodiment of the present disclosure, power section 16 includes an engine that may be electrically (e.g., via a generator and inverter system or other apparatus for providing electrical power) or hydraulically coupled to drive units in each of wheels 20, 22, 24 and 26. Although the drive units may be of any type, for the ease of explanation the drive units will be considered electrically driven motors that are independently driven at a commanded torque with the command being issued from the controller 60. The present disclosure affords the opportunity to provide a traction control system that allows for independent tuning of fore-aft speed error and lateral speed errors, both front and rear.

The traction controller can be a traction control unit (TCU). The TCU can comprise a microprocessor which is used to execute a traction control program. The TCU can contain circuitry to process both analog and digital on/off type inputs from sensors that are then used by the microprocessor to determine the current traction operation. The traction control program can be used to process measured operating conditions to derive the appropriate control output signals to run various traction control actuators. Additional parameters affecting the desired tractive operating conditions can be received from other control modules. The main traction control program, control algorithms, lookup tables, constants and other important aspects of the traction control program can be stored in a memory (e.g., a flash memory) so that the TCU operating characteristics can be upgraded in the field. Some often used routines such as table lookups can be stored in a non-volatile ROM, if available, since these routines will be generally required by every conceivable control program. Flash memory reprogramming routines may also be stored in the non-volatile ROM, allowing the microprocessor to execute a flash reprogramming program while the flash memory is unavailable for program execution. An EEPROM can be used to store serial numbers, unique ID codes and adaptation values. A RAM can be used to store temporary results. An inter-control module can transfers data to and from other vehicle systems. A communication port can provide a connection means for the TCU for diagnostic tests, error codes and TCU reprogramming. Similarly, the vehicle can include an engine control unit (ECU) that controls the internal combustion engine. Alternately, the TCU and ECU can be combined into a single controller or controller system.

Figure 2A:
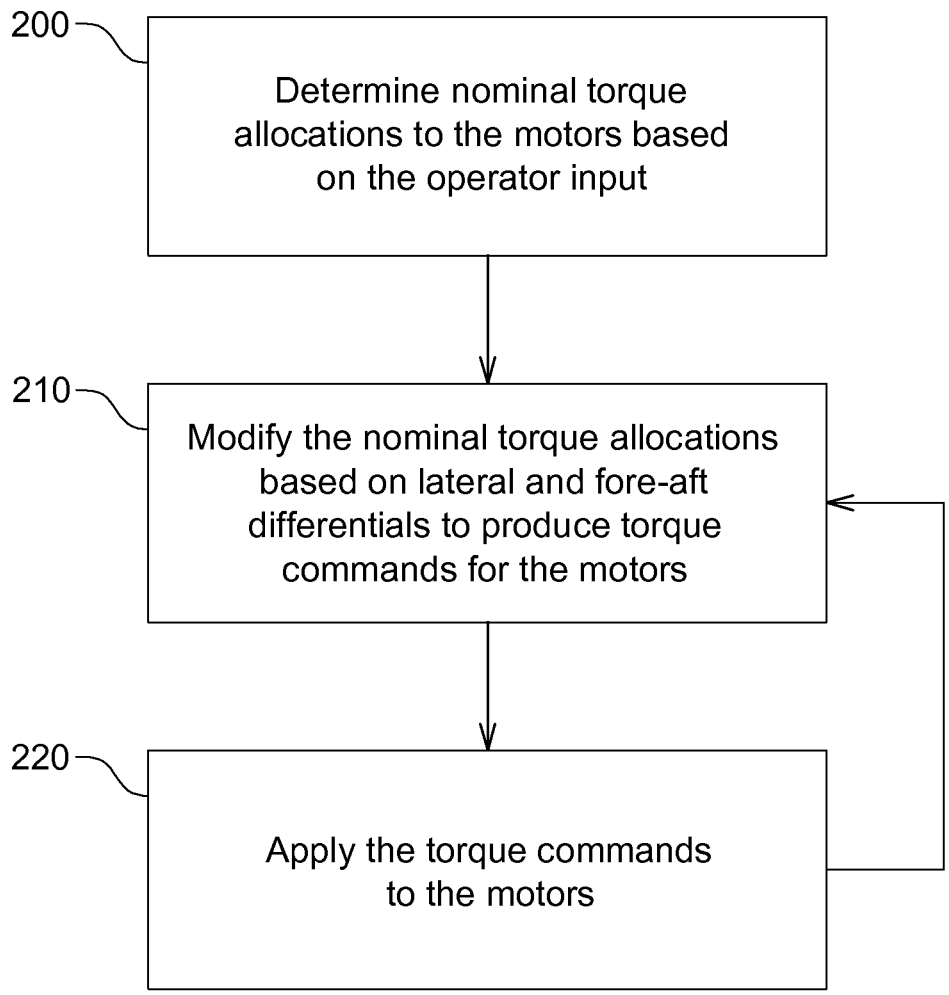
FIG. 2A is a flow chart showing a method for controlling traction of a work machine shown in FIG. 1.
Figure 2B:
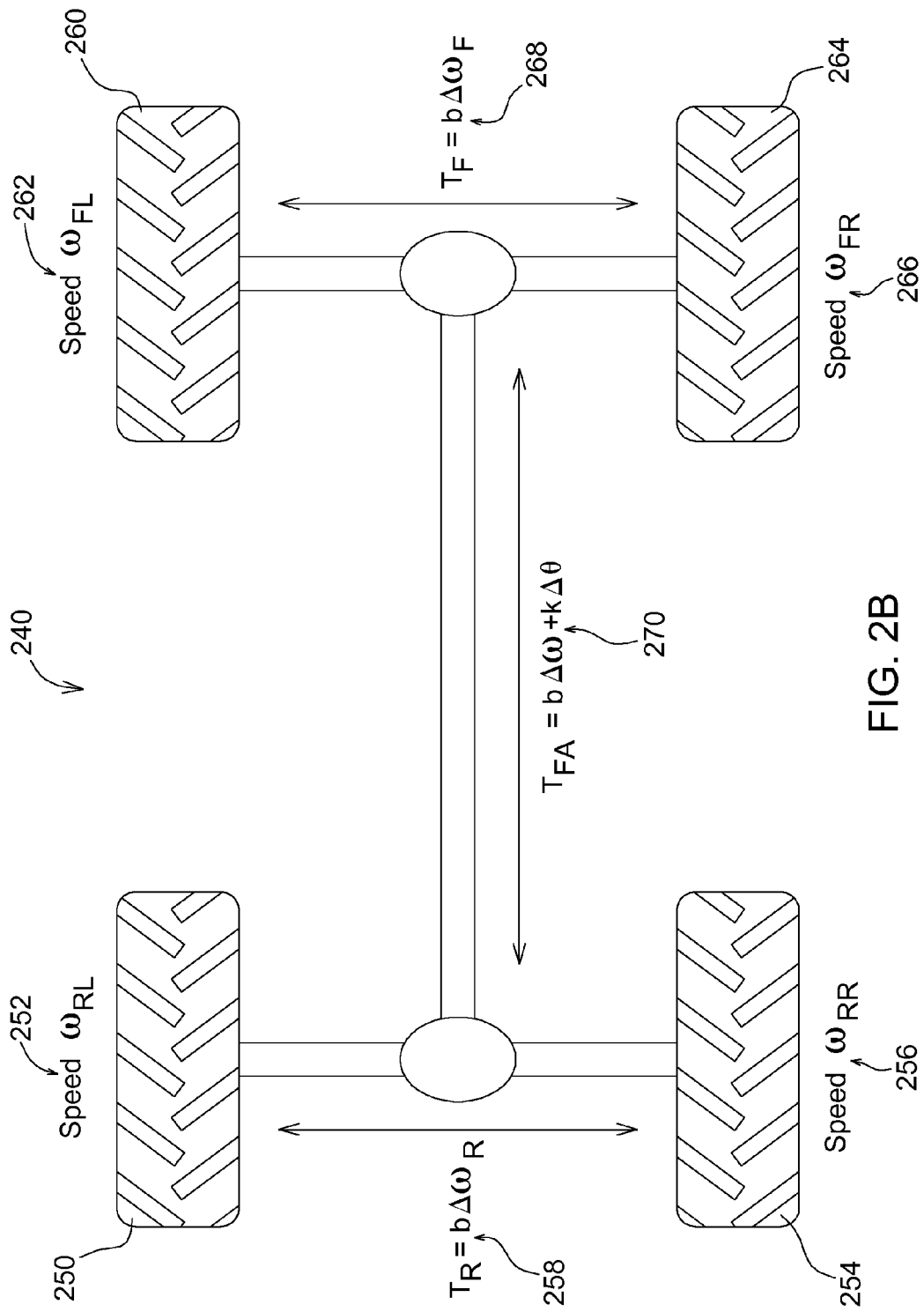
FIG. 2B is an illustration of a model of the drivetrain shown in FIG. 1.

FIGS. 2A and 2B illustrate the traction control system and method. In step 200, the nominal torque allocations to the motors are determined based on a desired torque provided via the operator input 62. In an embodiment, the desired torque is divided equally amongst the motors to determine the nominal torque allocations. In other embodiments, the desired torque could be allocated differently depending on machine characteristics, operation characteristics, or user preference. The torque command magnitudes can be limited as a function of motor speed to be less than the motor torque curve. The commands can then be scaled by the motor reference torque. The motor torque commands can also be converted from the machine frame of reference to the motor frame of reference. In the machine frame of reference, positive torque accelerates the machine forward. In the motor frame of reference, positive torque accelerates the motor clockwise when looking at the output shaft.

As discussed in more detail below, each motor command is adjusted by the traction control correction in step 210. FIG. 2B shows a model 240 of the disclosed differential traction control system. Model 240 shows the disclosed system in reference to a conventional drivetrain with limited slip axles. Rear wheels 250 and 252 have speeds 252 and 256, respectively, and front wheels 262 and 264 have speeds 262 and 264, respectively. Speeds 252, 256, 262, and 266 can include articulation angle compensation and be based on speed sensors on the machine or motors or be provided the motor controller. The disclosed differential traction control utilizes differential speeds components to control the traction. Rear differential correction torque 258 includes a rear lateral proportional term based on the difference between speeds 252 and 256.

Front differential correction torque 268 includes a front lateral proportional term based on the difference between speeds 262 and 264. Fore-aft differential correction torque 270 includes a fore-aft proportional term and a fore-aft integral term, both terms based on the difference between the average front speeds 262, 264 and the average rear speeds 252, 254. The lateral differential control can be compared to a conventional axle differential. The integral differential control can be compared to a torsional spring coupling and may exhibit similar behavior characteristics as drivetrain windup, but it can be wound as discussed below.

The correction torques can include a deadband, as discussed further below. The torque commands for rear motors are based on the nominal torque allocation, the fore-aft differential correction torque 270, and the rear lateral differential correction torque 258. The torque commands for the front motors are based on the nominal torque allocation, the fore-aft differential correction torque 270, and the front lateral differential correction torque 268.

In other embodiments, the lateral differential correction torques can include an integral term. Also the gains of the proportional and integral terms may be user selectable (e.g. on a user display or other input), which enables that component to be disabled or varied based on operator preferences.

In step 220, the torque commands are applied to the motors 21, 23, 25, and 27. Then the method returns to step 210 to make further modifications based on changing speeds 252, 256, 262, and 266. When the operator commands a different desired torque, the method returns to step 200.

Figure 3:
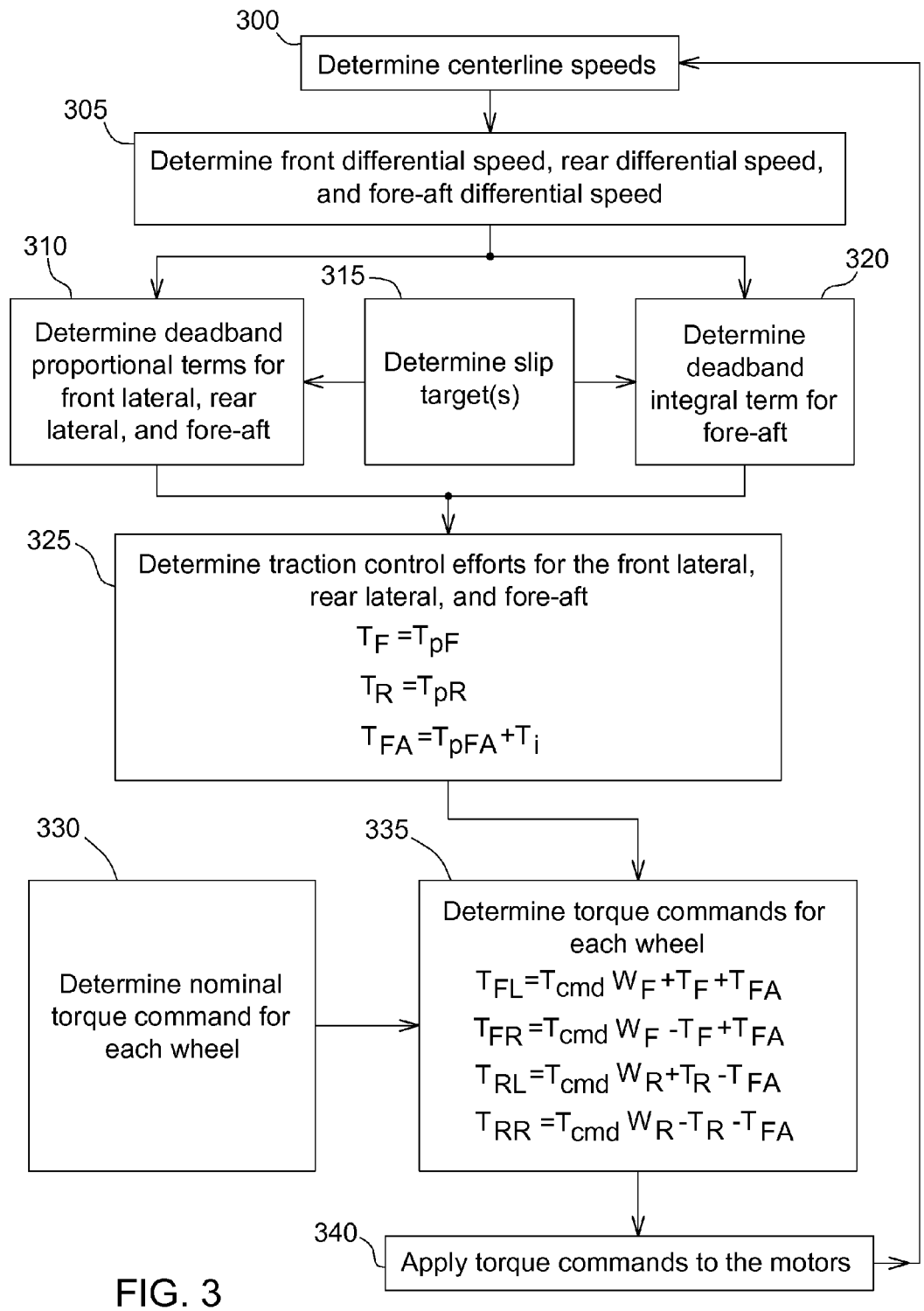
FIG. 3 is a flow chart showing a method for controlling traction of a work machine shown in FIG. 1

Referring now to FIG. 3, a traction control method starts at step 300 with the determination of the centerline speeds. The speeds used for traction control can be modified as a function of articulation angle and articulation angular velocity such that the desired differential speed while steering is zero. These are called centerline speeds, because they represent the speed of the axle center as estimated from each motor speed. Given the articulation angle $\theta$, the modified motor speeds in kph are:

$$v_j = \left( \frac{\frac{\omega_j}{r_{fd}} \frac{\pi}{30} \mp \dot{\theta} \frac{\pi}{180} \frac{W}{4r}}{1 \pm \theta \frac{\pi}{180} \frac{W}{2L}} \right) 3.6r,$$

where $\omega$ is motor speed in rpm, $r_{fd}$ is the final drive ratio, r is the nominal tire radius, W is the tread width, and L is the wheel base. The top operator corresponds to left motors, the bottom to right motors. The articulation angular velocity term, which is the top right term, may be omitted. In step 305, the rear right motor centerline speed is $v_{RR}$, the rear left motor centerline speed is $v_{RL}$, the front right centerline speed is $v_{FR}$, and the front left centerline speed is $v_{FL}$. As discussed above, the motor speeds can be sensed or otherwise provided. The articulation angle can be sensed or otherwise provided as well. The tire radius and tread width can be set to average sizes, but these parameters could also be input to the system.

In step 306, the differential speeds are determined. The traction control correction is an adjustment of the motor torque commands in order to reduce the relative speed of the motors. It is a state feedback control on three objectives, namely front differential speed $v_F$, rear differential speed $v_R$, and fore-aft differential speed $v_{FA}$ as follows:

$v_F = v_{FL} - v_{FR}$ $v_R = v_{RL} - v_{RR}$ $v_{FA} = v_{FL} + v_{FR} - v_{RL} - v_{RR}$ where $v_{FA}$ is the difference between the average front speed and the average rear speed, times two.

Figure 5:
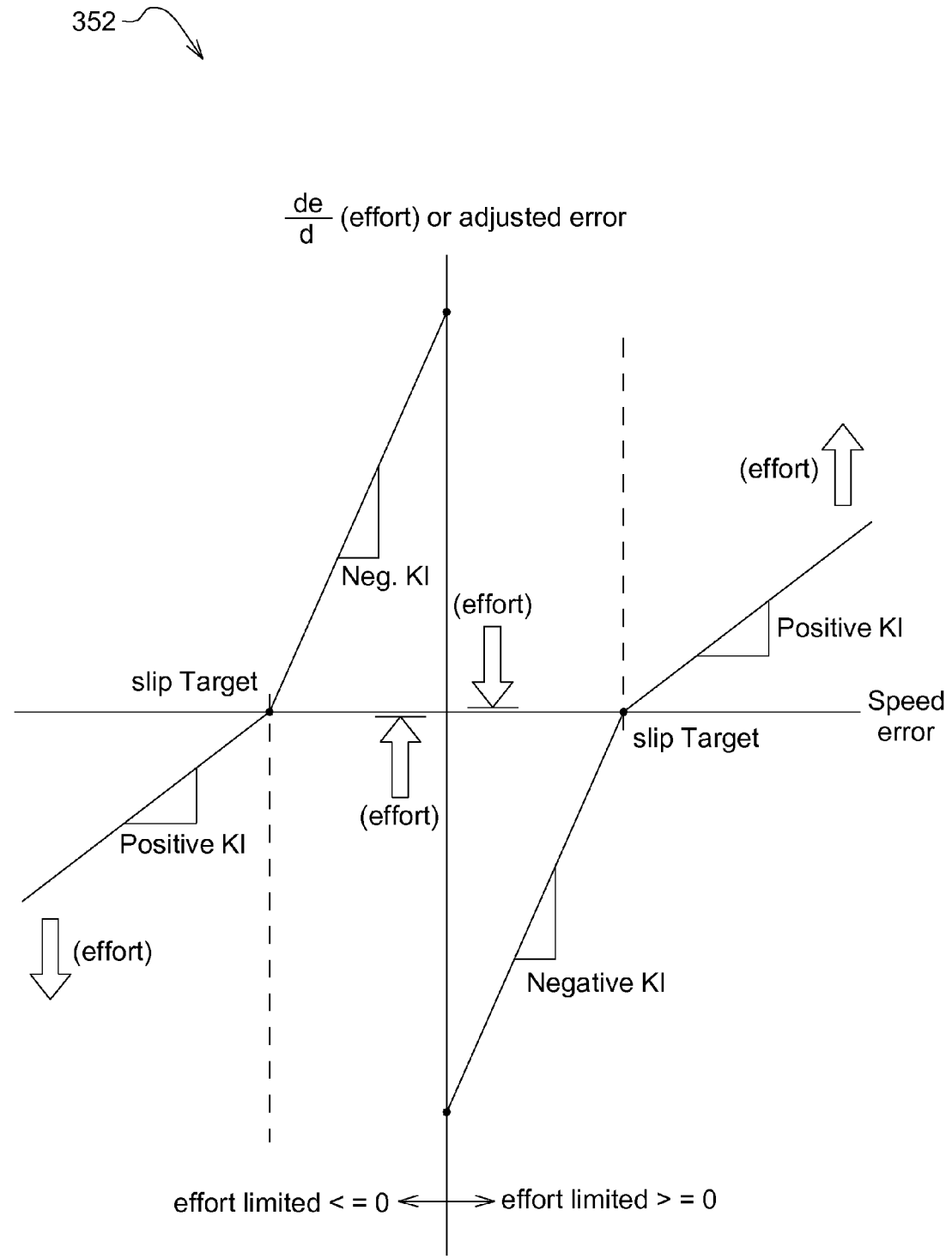
FIG. 5 is a graph utilized to help describe aspects of the present disclosure.

In step 315, the slip target(s), which also can be called the deadband speed, $v_{db}$ is/are determined as a function of an estimated ground speed v, as illustrated in graph 352 of FIG. 5. The control system addresses slip issues when the slips is more or less than the allowed slip. The slip targets for the proportional terms and the integral terms may be the same or different. The slip targets may be provided in a lookup table. The slip targets may be a small percentage at digging speed (e.g. 1%-3%) and a larger percentage at transport speed (10% to 20%). Furthermore, the deadband speed, or slip targets, could be adjusted by the operator.

In step 310, the deadband proportional terms $T_p$ are determined for front lateral $T_{pF}$, rear lateral $T_{pR}$, and fore-aft $T_{pFA}$. The deadband fore-aft proportional term (i.e., proportional effort) $T_{pFA}$ is $$T_{pFA} = \begin{cases} K_{pFA}(v_{FA} - v_{db}), & \text{if } v_{FA} > v_{db} \\ K_{pFA}(v_{FA} + v_{db}), & \text{if } v_{FA} < -v_{db} \\ 0 & \text{otherwise} \end{cases}$$

Lateral proportional terms are determined similarly.

In step 320, the fore-aft deadband integral term $T_i$ is determined. The integral term consists of two accumulators, one has a reference of $+v_{db}$ and is limited to be positive, and the other has a reference of $-v_{db}$ and is limited to be negative. These integrators share a common state. The integral term is also reduced toward zero as the nominal torque command decreases by $$T_{\Delta cmd} = \max(-1500, \min(0, K_{\Delta cmd}(T_{cmd(k)} - T_{cmd(k-1)})FNR))$$

$$FNR = \begin{cases} 1 & \text{for FORWARD} \\ 0 & \text{for NEUTRAL} \\ -1 & \text{for REVERSE} \end{cases}$$

Figure 4:
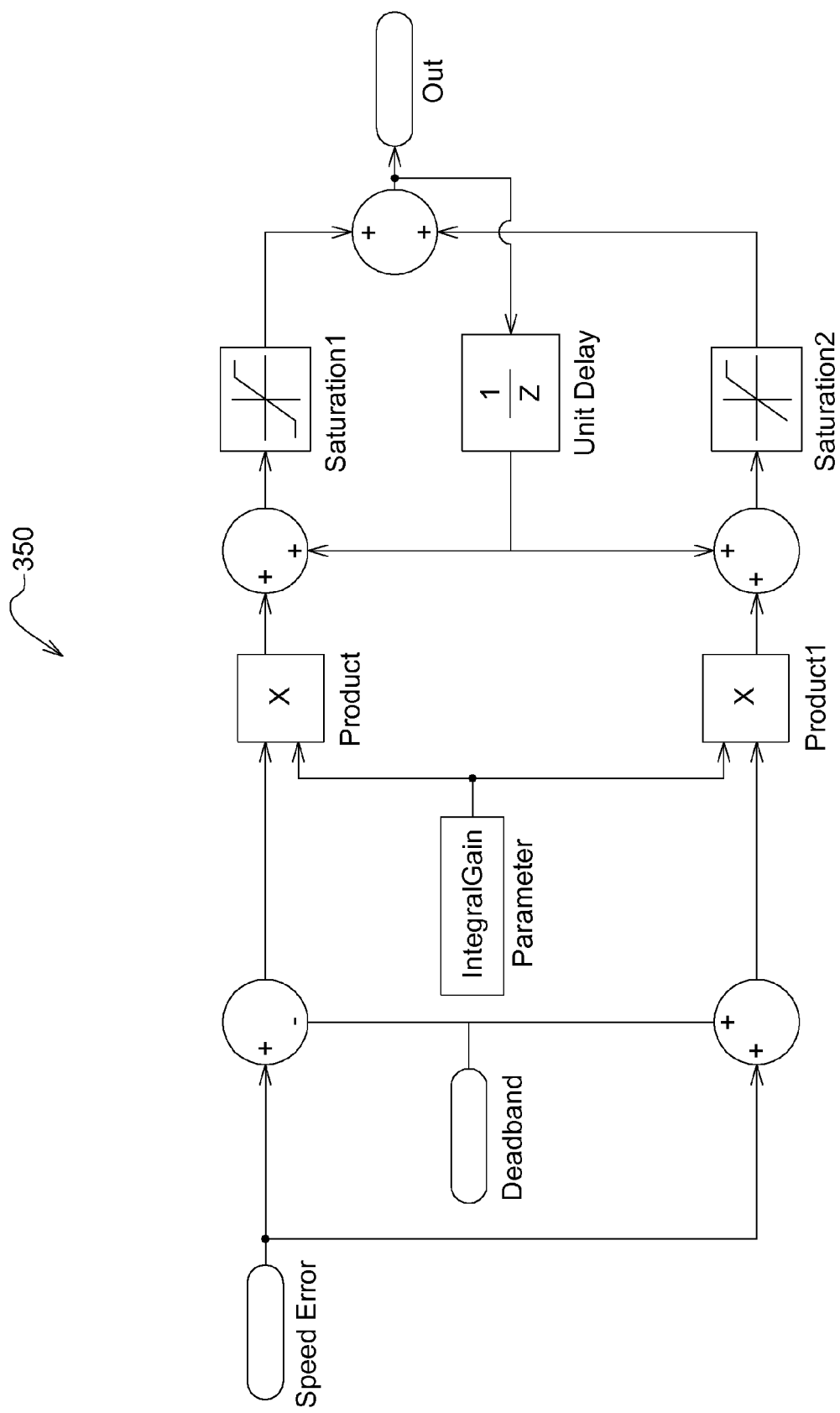
FIG. 4 is a schematicized control circuit illustrating aspects of the present disclosure.

The fore-aft deadband integral term (i.e., the integral effort) is $$T_{i(k)} = \begin{cases} T_{i(k-1)} + K_i T(v_{FA(k)} - v_{db}) + T_{\Delta cmd}, & \text{if } T_{i(k-1)} + K_i T v_{FA(k)} + T_{\Delta cmd} > K_i T v_{db} \\ T_{i(k-1)} + K_i T(v_{FA(k)} + v_{db}) - T_{\Delta cmd}, & \text{if } T_{i(k-1)} + K_i T v_{FA(k)} - T_{\Delta cmd} < -K_i T v_{db} \\ 0 & \text{otherwise} \end{cases}$$

where $T_i(k-1)$ is the integral effort from the previous time step. This is also illustrated in block diagram form in FIG. 4 that shows an example control circuit 350, where the sample T is omitted, but can be considered part of the integral gain. The $T_{\Delta cmd}$ term is also omitted from FIG. 4. When the FNR input is zero and the torque command is zero, the integral efforts are unwound toward zero exponentially to prevent wind up of the integrator, so that $$T_i(k) = (1 - K_{unwind})T_i(k-1), \text{ if } FNR = 0 \text{ AND } T_{cmd} = 0,$$
OR if brake pedal>70%

The fore-aft deadband integral term is protected against overflow based on operator inputs (e.g. commanded brake pedal or neutral). Hence, the integrator can be unwound if certain conditions are met. In other embodiments, lateral deadband integral terms could be used and can be determined similarly.

In step 325, the traction control efforts for the front lateral, rear lateral, and fore-aft are determined. The front lateral effort is named the front differential correction torque $T_F$, the rear lateral effort is named the rear differential correction torque $T_R$, and the fore-aft lateral effort is named the fore-aft differential torque $T_{FA}$. These correction torques are determined as follows:

$T_F = T_{pF}$ $T_R = T_{pR}$ $T_{FA} = T_{pFA} + T_i$

In alternate embodiments, the lateral correction torques can include an integral term. A user may also be able to select whether the correction torques include an integral term or change the gain (e.g., a button or switch depressed to disable/enable the integrator or dial to change the gain).

In step 330, the nominal torque command for the wheels are determined ($T_{cmd}W_F$ and $T_{cmd}W_R$) as discussed above with respect to step 200 of FIG. 2A. In step 335, the individual torque commands for each wheel is determined as follows:

$T_{FL} = T_{cmd}W_F + T_F + T_{FA}$ $T_{FR} = T_{cmd}W_F - T_F + T_{FA}$ $T_{RL} = T_{cmd}W_R + T_R - T_{FA}$ $T_{RR} = T_{cmd}W_R - T_R - T_{FA}$ The nominal torque commands for the front and rear are represented by different variables to allow for different torque commands to the front and rear, but they can be the same. Furthermore, the nominal torque commands for each wheel may have a separate variable.

In step 340, the individual torque commands for each wheel are applied to the motors. In some embodiments, differential traction control can be enabled only if all of the motors are in enabled state, and only if all of the motor speed measurements are valid. Lateral differential speed control can be enabled only if the articulation angle sensor is calibrated and the data is valid. In alternate embodiments, the differential control methods and system may be utilized to adjust the set of wheels that is slipping or may be used to just control the rear wheels. Also, the lateral gains could be collectively set to zero to disable them or not used/determined. In another embodiment, the fore-aft differential could be disabled or not used/determined. The lateral and fore-aft terms could also have different gains, or the gains could be selectively set (e.g., an operator depresses a button to disable the integrator). Alternately, an integrator could be enabled for the lateral, which would exhibit similar behavior to locking a lateral differential. In some embodiments, the control system could reduce the wheels that are slipping instead of increasing the other wheels.

As described in the present disclosure, the motors are electric motors, but could be hydraulic or other suitable motors that can be controlled in accordance with the embodiments. The present disclosure has been described with respect to wheels, but the disclosed embodiments could be used with other ground engaging elements.

Figure 8:
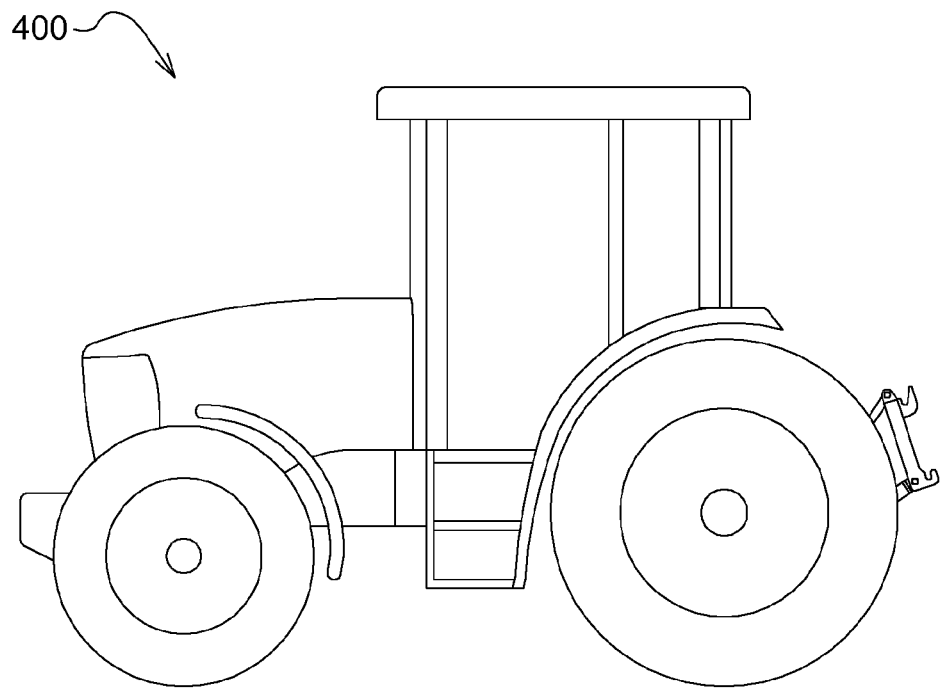
FIG. 8 is a perspective view of a work machine in accordance with an embodiment of the present disclosure.
Figure 9:
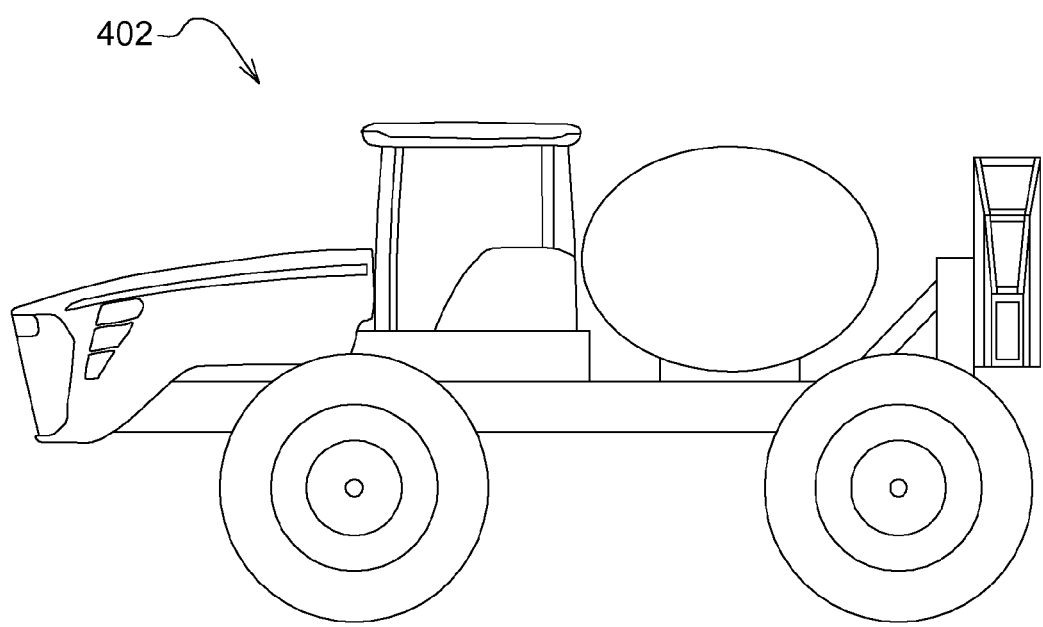
FIG. 9 is a perspective view of a work machine in accordance with an embodiment of the present disclosure.

The traction system and method disclosed in the present disclosure may be used with other work vehicles, such as tractor 400 shown in FIG. 8 and self-propelled sprayer 402 shown in FIG. 9. Furthermore, the embodiments disclosed in the present disclosure can be used for work vehicles with bogies or multiple axles. On a work vehicle with bogies, the two wheels on a bogie on the same side of the vehicle can be compared, and then the average of those two wheels can be compared with the average of the two opposite wheels of the bogie on the opposite side of the vehicle. On a work vehicle with multiple axles, the axles can be grouped according to the arrangement of the axles on the machine. For example, on an articulated dump truck, the two rear axles can be compared and then the average of the two rear axles can be compared with the front axle. On a forestry forwarder, the two rear axles can be compared, the two front axles can be compared, and the two rear axles can be compared with the two front axles. Or all axles could be compared to the overall average speed (e.g., a virtual speed).

While the disclosure has been illustrated and described in detail in the drawings and foregoing description, such illustration and description is not restrictive in character, it being understood that illustrative embodiment(s) have been shown and described and that all changes and modifications that come within the spirit of the disclosure are desired to be protected. Alternative embodiments of the present disclosure may not include all of the features described yet still benefit from at least some of the advantages of such features. Those of ordinary skill in the art may devise their own implementations that incorporate one or more of the features of the present disclosure and fall within the spirit and scope of the appended claims.

A description of the variables, expressions, and terms used in the present disclosure follows for the purposes of reference thereto:

| Variable | Units | Type | Description |
|---|---|---|---|
| $T_{cmd}$ | Nm | Input | Total nominal torque command |
| FNR | — | Input | Direction command |
| v | kph | Input | Ground speed estimate |
| $N_{FL}$ | rpm | Input | Front left motor speed |
| $N_{FR}$ | rpm | Input | Front right motor speed |
| $N_{RL}$ | rpm | Input | Rear left motor speed |
| $N_{RR}$ | rpm | Input | Rear right motor speed |
| $v_{FL}$ | kph | Input | Front left motor centerline speed |
| $v_{FR}$ | kph | Input | Front right motor centerline speed |
| $v_{RL}$ | kph | Input | Rear left motor centerline speed |
| $v_{RR}$ | kph | Input | Rear right motor centerline speed |
| $v_F$ | kph | | Front differential centerline speed |
| $v_R$ | kph | | Rear differential centerline speed |
| $v_{FA}$ | kph | | Fore-aft differential centerline speed |
| $v_{db}$ | kph | Table | Integrator deadband speed, vs. ground speed |
| $K_p$ | Nm/kph | Parameter | Lateral proportional gain |
| $K_{pFA}$ | Nm/kph | Parameter | For-aft proportional gain |
| $K_i$ | Nm/kph · s | Parameter | For-aft integral gain |
| $K_{unwind}$ | $T^{-1}$ | Parameter | Integrator unwinding factor |
| $W_F$ | — | Parameter | Nominal torque allocation factor, front |
| $W_R$ | — | Parameter | Nominal torque allocation factor, rear |
| $T_F$ | Nm | | Front differential correction torque |
| $T_R$ | Nm | | Rear differential correction torque |
| $T_{FA}$ | Nm | | For-aft differential correction torque |
| $T_{FL}$ | Nm | Output | Front left motor command |
| $T_{FR}$ | Nm | Output | Front right motor command |
| $T_{RL}$ | Nm | Output | Rear left motor command |
| $T_{RR}$ | Nm | Output | Rear right motor command |

What is claimed is:

1. A work vehicle comprising:
a front-left wheel;
a front-left motor mechanically coupled to the front-left wheel to provide torque to the front-left wheel;
a front-right wheel;
a front-right motor mechanically coupled to the front-right wheel to provide torque to the front-right wheel;
a rear-left wheel;
a rear-left motor mechanically coupled to the rear-left wheel to provide torque to the rear-left wheel; a rear-right wheel;
a rear-right motor mechanically coupled to the rear-right wheel to provide torque to the rear-right wheel; and
a traction controller electrically connected to the front-left motor, the front-right motor, the rear-left motor, and the rear-right motor, the traction controller configured to determine a front lateral differential correction, a rear lateral differential correction, and a fore-aft differential correction and apply an individual torque command to each of the front-left, front-right, rear-left, and rear-right motors,
the individual torque command for the front-left motor based on at least in part a commanded torque, the front lateral differential correction, and the fore-aft differential correction,
the individual torque command for the front-right motor based on at least in part the commanded torque, the front lateral differential correction, and the fore-aft differential correction,
the individual torque command for the rear-left motor based on at least in part the commanded torque, a rear lateral differential correction, and the fore-aft differential correction,
the individual torque command for the rear-right motor based on at least in part the commanded torque, the rear lateral differential correction, and the fore-aft differential correction,
wherein the controller is configured to apply an individual torque command for the front-left motor equal to a front-left motor nominal torque command plus the front lateral differential correction plus the fore-aft differential correction;
wherein the controller is configured to apply an individual torque command for the front-right motor equal to a front-right motor nominal torque command minus the front lateral differential correction plus the fore-aft differential correction;
wherein the controller is configured to apply an individual torque command for the rear-left motor equal to a rear-left motor nominal torque command plus the rear lateral differential correction minus the fore-aft differential correction; and
wherein the controller is configured to apply an individual torque command for the rear-right motor equal to a rear-right motor nominal torque command minus the rear lateral differential correction minus the fore-aft differential correction.

2. The work vehicle of claim 1, wherein the front-left motor nominal torque command equals the front-right motor nominal torque command; and
wherein the rear-left motor nominal torque command equals the rear-right motor nominal torque command.

3. A method of controlling a work vehicle, the method comprising:
determining nominal torque allocations to a set of motors, the motors connected to ground engaging elements and including a front set of motors and a rear set of motors;
modifying the nominal torque allocations based on a lateral differential correction and a fore-aft differential correction to produce modified torque commands;
applying the modified torque commands to the set of motors;

determining a fore-aft differential speed, wherein the fore-aft differential correction comprises a fore-aft integral term and a fore-aft proportional term, the fore-aft integral term based on at least in part the fore-aft differential speed and the fore-aft proportional term based on at least in part the fore-aft differential speed; and determining a front lateral differential speed and determining a rear lateral differential speed, wherein a front lateral differential correction comprises a front lateral proportional term based on at least in part the front lateral differential speed, and wherein a rear lateral differential correction comprises a rear lateral proportional term based on at least in part the rear lateral differential speed.

4. The method of claim 3, wherein each set of motors includes a right and a left motor, the modified torque allocation for the front-left motor equals a front-left motor nominal torque command plus the front lateral differential correction plus the fore-aft differential correction; wherein modified torque command for the front-right motor equals a front-right motor nominal torque command minus the front lateral differential correction plus the fore-aft differential correction; wherein the modified torque command for the rear-left motor equals a rear-left motor nominal torque command plus the rear lateral differential correction minus the fore-aft differential correction; and wherein the modified torque command for the rear-right motor equals a rear-right motor nominal torque command minus the rear lateral differential correction minus the fore-aft differential correction.

5. The method of claim 4, wherein the front-left motor nominal torque command equals the front-right motor nominal torque command; and wherein the rear-left motor nominal torque command equals the rear-right motor nominal torque command.

6. The method of claim 4, wherein the fore-aft integral term is a deadband integral term and the fore-aft proportional term is a deadband proportional term.

* * * * *